United States Patent
Hatchett et al.

(10) Patent No.: US 11,427,480 B2
(45) Date of Patent: Aug. 30, 2022

(54) CONVERSION OF URANIUM HEXAFLUORIDE AND RECOVERY OF URANIUM FROM IONIC LIQUIDS

(71) Applicant: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

(72) Inventors: David W. Hatchett, Las Vegas, NV (US); Kenneth R. Czerwinski, Seattle, WA (US); Katherine Luebke, Las Vegas, NV (US); Cassara Higgins, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, Las Vegas, NV (US)

(*) Notice: Subject to any disclaimer, the term of this patent is extended or adjusted under 35 U.S.C. 154(b) by 0 days.

(21) Appl. No.: 17/438,112

(22) PCT Filed: Mar. 29, 2019

(86) PCT No.: PCT/US2019/024870
§ 371 (c)(1),
(2) Date: Sep. 10, 2021

(87) PCT Pub. No.: WO2020/204879
PCT Pub. Date: Oct. 8, 2020

(65) Prior Publication Data
US 2022/0041464 A1 Feb. 10, 2022

(51) Int. Cl.
*C25C 3/34* (2006.01)
*C01G 43/025* (2006.01)
*C25C 7/06* (2006.01)
*C01G 43/06* (2006.01)

(52) U.S. Cl.
CPC ......... *C01G 43/063* (2013.01); *C01G 43/025* (2013.01); *C25C 3/34* (2013.01); *C25C 7/06* (2013.01); *C01P 2002/72* (2013.01); *C01P 2002/85* (2013.01); *C01P 2002/88* (2013.01); *C01P 2004/03* (2013.01)

(58) Field of Classification Search
CPC ....................................................... C25C 3/34
See application file for complete search history.

(56) References Cited

U.S. PATENT DOCUMENTS

| | | | |
|---|---|---|---|
| 3,353,929 A * | 11/1967 | Knacke | B01J 8/04 423/19 |
| 4,769,180 A | 9/1988 | Echigo et al. | |
| 7,172,741 B2 | 2/2007 | Kawamura et al. | |
| 9,217,189 B2 | 12/2015 | Davidson et al. | |
| 9,382,632 B2 | 7/2016 | Garcia-Diaz et al. | |
| 9,631,290 B2 | 4/2017 | Hatchett et al. | |
| 2013/0087464 A1* | 4/2013 | Hatchett | C25D 3/54 205/261 |
| 2013/0233716 A1* | 9/2013 | Hatchett | C25D 3/54 205/43 |
| 2014/0070434 A1* | 3/2014 | Visser | G21C 21/02 977/773 |
| 2014/0374272 A1* | 12/2014 | Garcia-Diaz | C25C 7/02 204/230.2 |
| 2017/0306514 A1* | 10/2017 | Hatchett | C22B 3/20 |

FOREIGN PATENT DOCUMENTS

JP 2009-036617 A * 2/2009

OTHER PUBLICATIONS

Rogers et al, editors, Green Industrial Applications of Ionic Liquids, NATO Science Series vol. 92, 2002 (Year: 2002).*
Ohashi et al, Feasibility studies on electrochemical recovery of uranium from solid wastes contaminated with uranium using 1-butyl-3-methylimidazorium chloride as an electrolyte, Journal of Nuclear Materials, vol. 464, Sep. 2015, pp. 119-127 (Year: 2015).*
Shen et al, Environmentally Friendlier Approach to Nuclear Industry: Recovery of Uranium from Carbonate Solutions Using Ionic Liquids, Industrial & Engineering Chemistry Research, vol. 54, No. 34, Aug. 2015, pp. 8624-8628 (Year: 2015).*
Rao et al, Electrodeposition of metallic uranium at near ambient conditions from room temperature ionic liquid, Journal of Nuclear Materials, vol. 408, No. 1, Jan. 2011, pp. 25-29 (Year: 2011).*
International Search Report and Written Opinion mailed in International Patent Application No. PCT/US2019/024870 (dated Nov. 14, 2019).
CRC Handbook of Chemistry and Physics, "Electrochemical Series", Ed. David R. Lide, 76th Ed, 1995, table 8-23.
International Preliminary Report on Patentability for Application No. PCT/US19/24870 dated Sep. 28, 2021 (5 pages).

* cited by examiner

*Primary Examiner* — Harry D Wilkins, III
(74) *Attorney, Agent, or Firm* — Michael Best & Friedrich LLP

(57) ABSTRACT

Described are methods for the recovery of uranium from uranium hexafluoride dissolved directly into ionic liquids.

16 Claims, 8 Drawing Sheets

CONVERSION OF URANIUM HEXAFLUORIDE AND RECOVERY OF URANIUM FROM IONIC LIQUIDS

STATEMENT REGARDING FEDERALLY-SPONSORED RESEARCH OR DEVELOPMENT

This invention was made with government support under contract number DE-NA0003624, subcontract 159313, awarded by the Department of Energy. The government has certain rights in the invention.

CROSS-REFERENCE TO RELATED APPLICATION(S)

This application is a U.S. national stage entry of International Patent Application No. PCT/US2019/024870, filed on Mar. 29, 2019, the entire contents of which are fully incorporated herein by reference.

TECHNICAL FIELD

The present disclosure relates to methods for recovery of uranium from uranium hexafluoride.

BACKGROUND OF THE INVENTION

Uranium hexafluoride ($UF_6$) is a highly volatile and reactive form of uranium that is part of the national stockpile of nuclear materials. Ninety-five percent of the world-wide depleted uranium is in the form of $UF_6$. There is a need to convert reactive $UF_6$ into more stable materials that can be utilized in subsequent applications. However, $UF_6$ reacts violently with water producing uranyl fluoride and hydrofluoric acid (HF), and is extremely volatile and sublimes at room temperature.

Therefore, there remains a need for methods that safely transform $UF_6$ that are required to deal with the large stockpile of material currently available worldwide.

BRIEF SUMMARY OF THE INVENTION

The disclosure provide methods for recovering uranium. In one aspect, the methods comprise dissolving uranium hexafluoride ($UF_6$) directly into an ionic liquid at concentrations greater than 0M and less than or equal to 0.5M; and applying a potential to the ionic liquid to deposit uranium onto an electrode as a metal.

In another aspect, the methods comprise dissolving uranium hexafluoride ($UF_6$) directly into an ionic liquid solvent at concentrations ≥0.5M to form a solid precipitate in an ionic liquid solution; separating the solid precipitate from the ionic liquid solution; and thermal processing the solid precipitate.

Other aspects and embodiments of the disclosure will become apparent in light of the following description and drawings.

BRIEF DESCRIPTIONS OF THE DRAWINGS

The patent or application file contains at least one drawing executed in color. Copies of this patent or patent application publication with color drawings will be provided by the Office upon request and payment of the necessary fee.

FIG. 1 is images showing the electrochemical recovery of uranium from an ionic liquid. The left panel is an image of the electrochemical reaction in which uranium deposits are formed on the electrode. The right image is scanning electron microscopy image of the uranium deposits.

Figure 8:
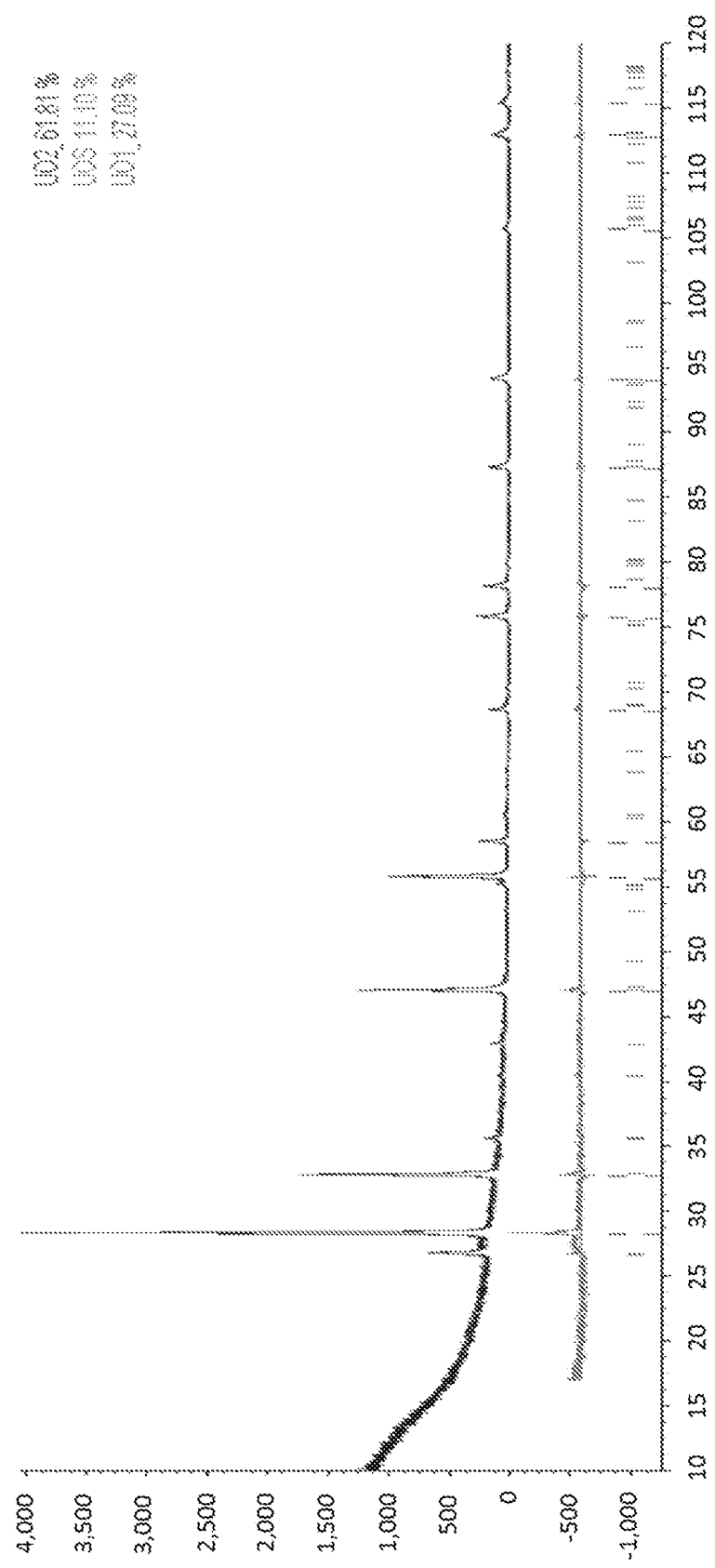

FIG. 8 is a PXRD pattern of the uranium precipitate following TGA. UO2 is $UO_2$, and UO1 indicates that the uranium and oxygen atoms are slightly less than a 1:2 ratio. The sulfur in UOS is likely from residual TFSI.

DETAILED DESCRIPTION OF THE INVENTION

The present disclosure provides methods for recovery of uranium from uranium hexafluoride. The direct dissolution of uranium hexafluoride has been achieved in ionic liquids (ILs) without any further chemical modifications. In addition, the uranium hexafluoride was chilled prior to dissolution in the IL to ensure the material was not volatilized. The dissolution results in reduction of uranium hexafluoride to, the much more stable and relatively benign, uranium tetrafluoride. Two recovery paths for the uranium have been achieved following dissolution: precipitation and electrochemical reduction. Both methods provide a path to safely transform $UF_6$ and recover useful forms of uranium.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of," and "consisting essentially of" the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

The term "alkyl," as used herein, means a straight or branched, saturated hydrocarbon chain. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, 4,4-dimethylpentan-2-yl, n-heptyl, n-octyl, n-nonyl, and n-decyl.

The term "substituted" refers to a group that may be further substituted with one or more non-hydrogen substituent groups. For example, alkyl-substituted ammonium cations refer to an ammonium group which may be substituted with at least one alkyl group, as described herein. In some embodiments, a group may be substituted with two alkyl groups, such that it is dialkyl substituted, or four alkyl group, such that it is tetraalkyl substituted.

The term "ionic liquid" or "IL" refers to a salt which melts at a relatively low temperature. An ionic liquid is essentially a salt in the liquid state. Some ionic liquids are room temperature ionic liquids or "RTILs" which indicates they are liquids at room temperature. While ordinary liquids such as water and gasoline are predominantly made of electrically neutral molecules, ionic liquids are largely made of ions and ion pairs (i.e., cations and anions). The physical properties of an IL vary with the identity of the cation/anion species. Any salt that melts without decomposing or vaporizing can usually yield an ionic liquid. Sodium chloride (NaCl), for example, melts at 801° C. (1,474° F.) into a liquid that consists largely of sodium cations (Na+) and chloride anions (Cl–).

The term "reductive decomposition" refers generally to the electrochemical stability of solvent molecules, such that at increasingly negative (reducing) potentials the molecules become unstable and decompose. Herein, the solvent molecules are the ionic liquids.

2. Methods

The present disclosure provides methods for recovering uranium. In one aspect, the methods comprise an electrochemical reduction. In another aspect, the methods comprise precipitation of a uranium salt, which may be further refined to uranium metal.

a. Electrochemical Reduction

The method to recover uranium may comprise dissolving uranium hexafluoride ($UF_6$) directly into an ionic liquid at concentrations greater than 0 M and less than or equal to 0.5 M and applying a potential to the ionic liquid to deposit uranium onto an electrode as a metal. The method may further comprise chilling the $UF_6$ prior to dissolving the $UF_6$ in the ionic liquid.

The concentration of uranium hexafluoride ($UF_6$) in the ionic liquid solvent may be less than or equal to 0.5 M, less than or equal to 0.4 M, less than or equal to 0.3 M, less than or equal to 0.2 M, less than or equal to 0.1 M, less than or equal to 0.01 M or less than or equal to 0.005 M. The concentration of uranium hexafluoride ($UF_6$) in the ionic liquid solvent may be greater than 0 M, greater than 0.005 M, greater than 0.01 M, greater than 0.1 M, greater than 0.2 M, greater than 0.3 M, or greater than 0.4 M.

The ionic liquid may be any combination of cation and anion. The combination of cation and anion may be chosen to influence the properties of the solution as necessary for optimization of the methods described herein. The ionic liquid may be a room temperature ionic liquid (RTIL). RTILs are those liquid at room temperature. RTILs have similar electrochemical properties of other ionic liquids without the need for elevated temperatures, and the large potential window of RTIL solutions is beneficial for electrochemical reduction.

The ionic liquid may be a simple ionic liquid, containing one type of cation with one type of anion. The ionic liquid may be a complex or mixed ionic liquid, containing several types of anions and cations or double salts.

The ionic liquid may comprise an anion with a lone pair of electrons. In some embodiments the anion is selected from the group consisting of n-bis(trifluoromethanesulfonylimide) (TFSI), dicyanomide, trifluoroacetate, alkyl sulfonates, alkyl sulfates, bis(fluorosulfonyl)imide, and trifluoromethylacetate. In exemplary embodiments, the ionic liquid comprises a n-bis(trifluoromethanesulfonylimide) (TFSI) anion.

The stability of the ionic liquid needs to be appropriate for the electrochemical deposition of uranium. Cations and anions of ionic liquids may undergo decomposition at various potential values. In some embodiments, the ionic liquid comprises a cation that is stable and does not undergo reductive decomposition at a potential between –2 and –4 Volts. The cation may be selected from the group consisting of alkyl-substituted or unsubstituted ammonium cations, alkyl-substituted or unsubstituted piperidinium cations, and alkyl-substituted or unsubstituted pyrrolidinium cations. In some embodiments, the cation is selected from the group consisting of tetraalkylammonium cation, a dialkylpiperidinium cation, and dialkylpyrrolidinium cation. In exemplary embodiments, the ionic liquid comprises a methylpropyl piperidinium cation.

The applied potential may be any potential which allows the deposition of uranium onto an electrode as a metal. The applied potential may be more negative than −2 Volts. The applied potential may be more negative than −2.25 Volts, −2.5 Volts, −2.75 Volts, −3 Volts, −3.25 Volts, −3.5 Volts, −3.75 Volts or −4 Volts. In some embodiments, the applied potential is pulsed. In some embodiments, the applied potential is constant.

b. Precipitation

The method to recover uranium may comprise the methods comprise dissolving uranium hexafluoride ($UF_6$) directly into an ionic liquid at concentrations greater than or equal to 0.5 M to form a solid precipitate in an ionic liquid solution, separating the solid precipitate from the ionic liquid solution, and thermal processing the solid precipitate. The method may further comprise chilling the $UF_6$ prior to dissolving the $UF_6$ in the ionic liquid.

In some embodiments, the thermal processing is under an inert atmosphere to form uranium metal. In some embodiments, the thermal processing is under an ambient atmosphere to form uranium oxide, $UO_2$.

The concentration of uranium hexafluoride ($UF_6$) into the ionic liquid solvent may be greater than 0.5 M, greater than 0.75 M, greater than 1 M, greater than 1.25 M, greater than 1.5 M, or greater than 2.0 M. The concentration of uranium hexafluoride ($UF_6$) into the ionic liquid solvent may be less than 2.4 M, less than 2.0 M. less than 1.5 M, less than 1.25 M, less than 1 M, or less than 0.75 M.

The ionic liquid may be any combination of cation and anion. The combination of cation and anion may be chosen to influence the properties of the solution as necessary for optimization in the methods described herein. The ionic liquid may be a room temperature ionic liquid (RTIL). RTILs are those liquid at room temperature. RTILs have similar electrochemical properties of other ionic liquids without the need for elevated temperatures.

The ionic liquid may be a simple ionic liquid, containing one type of cation with one type of anion. The ionic liquid may be a complex or mixed ionic liquid, containing several types of anions and cations or double salts.

The ionic liquid may comprise an anion with a lone pair of electrons. In some embodiments the anion is selected from the group consisting of n-bis(trifluoromethanesulfonylimide) (TFSI), dicyanomide, trifluoroacetate, alkyl sulfonates, alkyl sulfates, bis(fluorosulfonyl)imide, and frifluoromethylacetate. In exemplary embodiments, the ionic liquid comprises a n-bis(trifluoromethanesulfonylimide) (TFSI) anion.

The solid precipitate may be a salt comprising the cation of the ionic liquid and a reduced form of the uranium hexafluoride ($UF_6^{2-}$). The ionic liquid may comprise a cation that has a charge such that the salt which forms between the cation and reduced $UF_6^{2-}$ is charge neutral.

In some embodiments, the precipitate comprises a salt of a uranium hexafluoro anion and the ionic liquid cation. In some embodiments, the ionic liquid solution comprises uranium hexafluoride dissolved in the ionic liquid.

Thermal processing of the solid precipitate may be completed by any of the known methods in the art, such as use of a melting furnace. In some embodiments, the thermal processing may be done under an inert atmosphere to form uranium metal. In some embodiments, the thermal processing may be done under an oxygen containing atmosphere to form a uranium oxides.

In some embodiments, the ionic liquid solution comprises uranium hexafluoride dissolved in the ionic liquid. In some embodiments, the method further comprises applying a potential to the ionic liquid solution after separation of the solid precipitate to deposit the remaining uranium in the ionic liquid solution onto an electrode as a metal. The applied potential may be any potential which allows the deposition of uranium onto an electrode as a metal. The applied potential may be more negative than −2 Volts. The applied potential may be more negative than −2.25 Volts, −2.5 Volts, −2.75 Volts, −3 Volts, −3.25 Volts, −3.5 Volts, −3.75 Volts or −4 Volts. In some embodiments, the applied potential is pulsed. In some embodiments, the applied potential is constant.

The stability of the ionic liquid needs to be appropriate for the electrochemical deposition of uranium. Cations and anions of ionic liquids may undergo decomposition at various potential values. In some embodiments, the ionic liquid comprises a cation that is stable and does not undergo reductive decomposition at a potential between −2 and −4 Volts. The cation may be selected from the group consisting of alkyl-substituted or unsubstituted ammonium cations, alkyl-substituted or unsubstituted piperidinium cations, and alkyl-substituted or unsubstituted pyrrolidinium cations. In some embodiments, the cation is selected from the group consisting of tetraalkylammonium cation, a dialkylpiperidinium cation, and dialkylpyrrolidinium cation. In exemplary embodiments, the ionic liquid comprises a methylpropyl piperidinium cation.

3. Examples

It will be readily apparent to those skilled in the art that other suitable modifications and adaptations of the methods of the present disclosure described herein are readily applicable and appreciable, and may be made using suitable equivalents without departing from the scope of the present disclosure or the aspects and embodiments disclosed herein. Having now described the present disclosure in detail, the same will be more clearly understood by reference to the following examples, which are merely intended only to illustrate some aspects and embodiments of the disclosure, and should not be viewed as limiting to the scope of the disclosure. The disclosures of all journal references, U.S. patents, and publications referred to herein are hereby incorporated by reference in their entireties.

Example 1: $UF_6$ Dissolution in Ionic Liquids

Dissolution Process: A closed and sealed vessel of $UF_6$ was cooled in a liquid nitrogen well within a glovebox for several hours to ensure the species was solid. The vessel was unsealed and the $UF_6$ was transferred into a second vessel containing 20 ml of an ionic liquid (IL) using a metal spatula. Mass measurements were taken of the empty vial, the vial after adding IL, and the vial after adding $UF_6$. The concentration in molarity was obtained using the formula mass of the $UF_6$ and the volume of IL. The sample was continuously stirred using a magnetic Teflon bar on a stir plate. No manual shaking of the sample was utilized to enhance dissolution.

UV-Vis: The dissolved $UF_6$ sample was pipetted into a 1 cm path-length quartz cuvette until it was at least ¾ full. The cuvette was sealed with a screw-top cap.

Complete dissolution was seen within 3 hours for lower concentration (~0.2M) and within minutes for higher concentration (1-1.5M) when using methylpropylpiperidinium bis(trifluoromethane (MPPiTFSI). When UF$_6$ was introduced to the ionic liquid evidence of a reduction was observed by the transition from a white solid to a green solution. Higher concentration samples formed a green precipitate. Without being bound by theory, a potential mechanism for the dissolution was hypothesized as shown in the equation below.

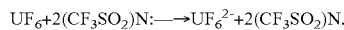

UF$_6$+2(CF$_3$SO$_2$)N:⟶UF$_6^{2-}$+2(CF$_3$SO$_2$)N.

The ILs that have been utilized include: N-trimethyl-N-butyl ammonium n-Bis(trifluoromethanesulfonyl)imide (TFSI-), 1-butyl-1-methylpiperidinium (BPPI) (TFSI-), methylpropylpiperidinium (TFSI-), and 1-methyl-1-propylpiperidinium (MPPI) (TFSI-).

This process was also tested in 1-butyl-3-methylimidazolium (BMI) tetrafluoroborate (BF$_4^-$). However, dissolution was achieved after a significantly longer period of time suggesting that the lack of lone pair slowed the dissolution. This was believed to be due to the lack of a lone pair of electrons for the reduction of the UF$_6$, as shown in the proposed mechanism above.

Example 2: Electrochemical Recovery of Uranium from ILs

Electrochemistry: All electrochemical studies were performed with an Au working electrode, Pt auxiliary electrode (Electrode Area ~1.5× working electrode area), and an ionic liquid based Ag/Ag+ reference electrode standardized versus the ferrocene redox couple. Cyclic voltammetry and constant potential methods were utilized to characterize the electrochemical properties of the UF$_6$ and achieve deposition. Depositions were conducted over a 24 hour period. In some instances, samples were subjected to two or three consecutive 24 hours periods or multiple electrodes were used to obtain deposits from the same solution.

Figure 1:
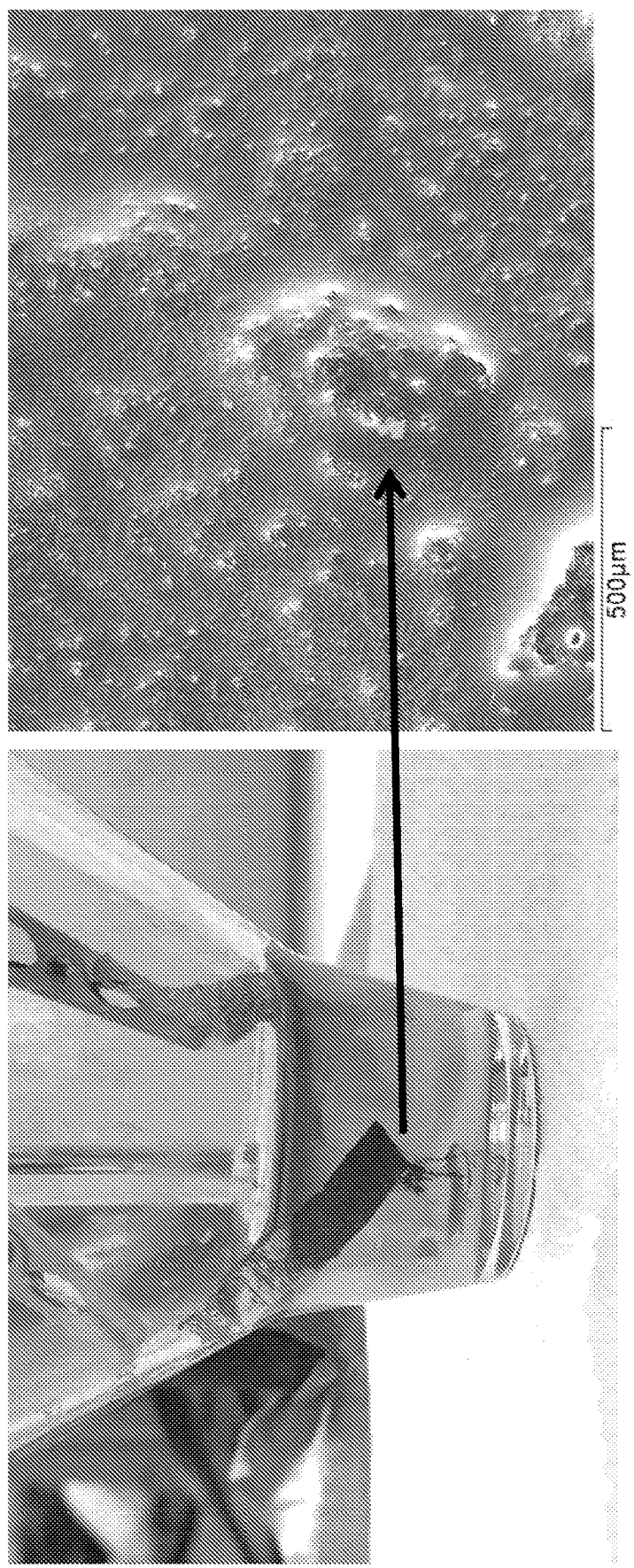

The dissolution process as described in Example 1, was used to dissolve ~0.5M UF$_6$ in MPPiTFSI for electrochemical recovery. The potential was set at −3.0V for 24 hours. As shown in FIG. 1, black deposits are seen on the electrode which correspond with uranium deposits as shown by scanning electron microscopy.

Figure 2A:
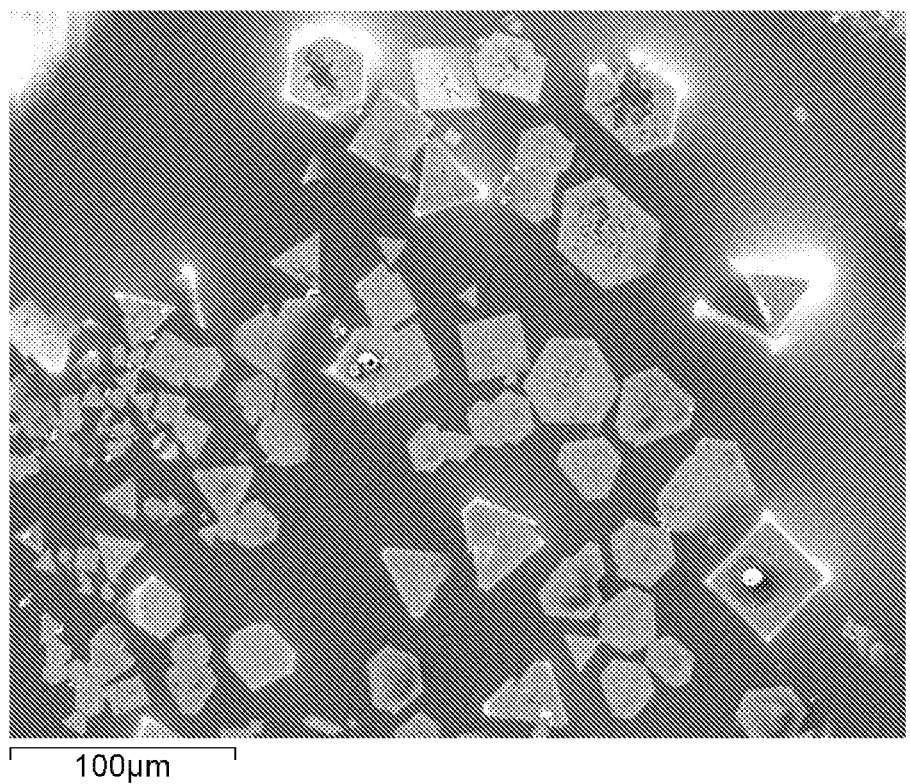
FIG. 2A and FIG. 2B are Scanning Electron Microscopy (SEM) images of uranium metal crystals. Box in FIG. 2B notes the geometric metal crystals.
Figure 2B:
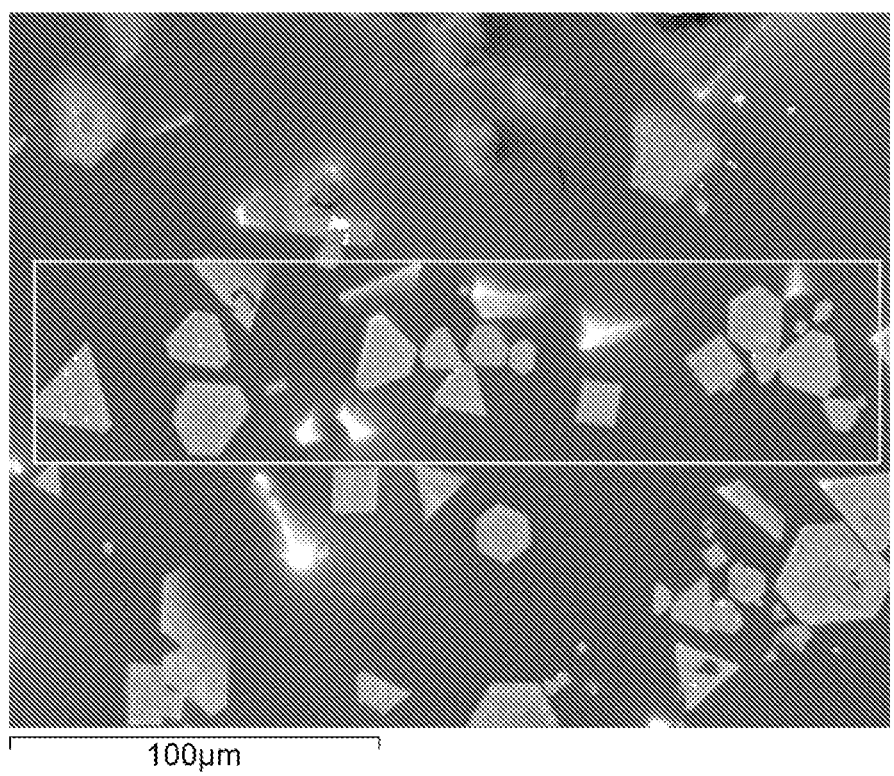
Figure 3:
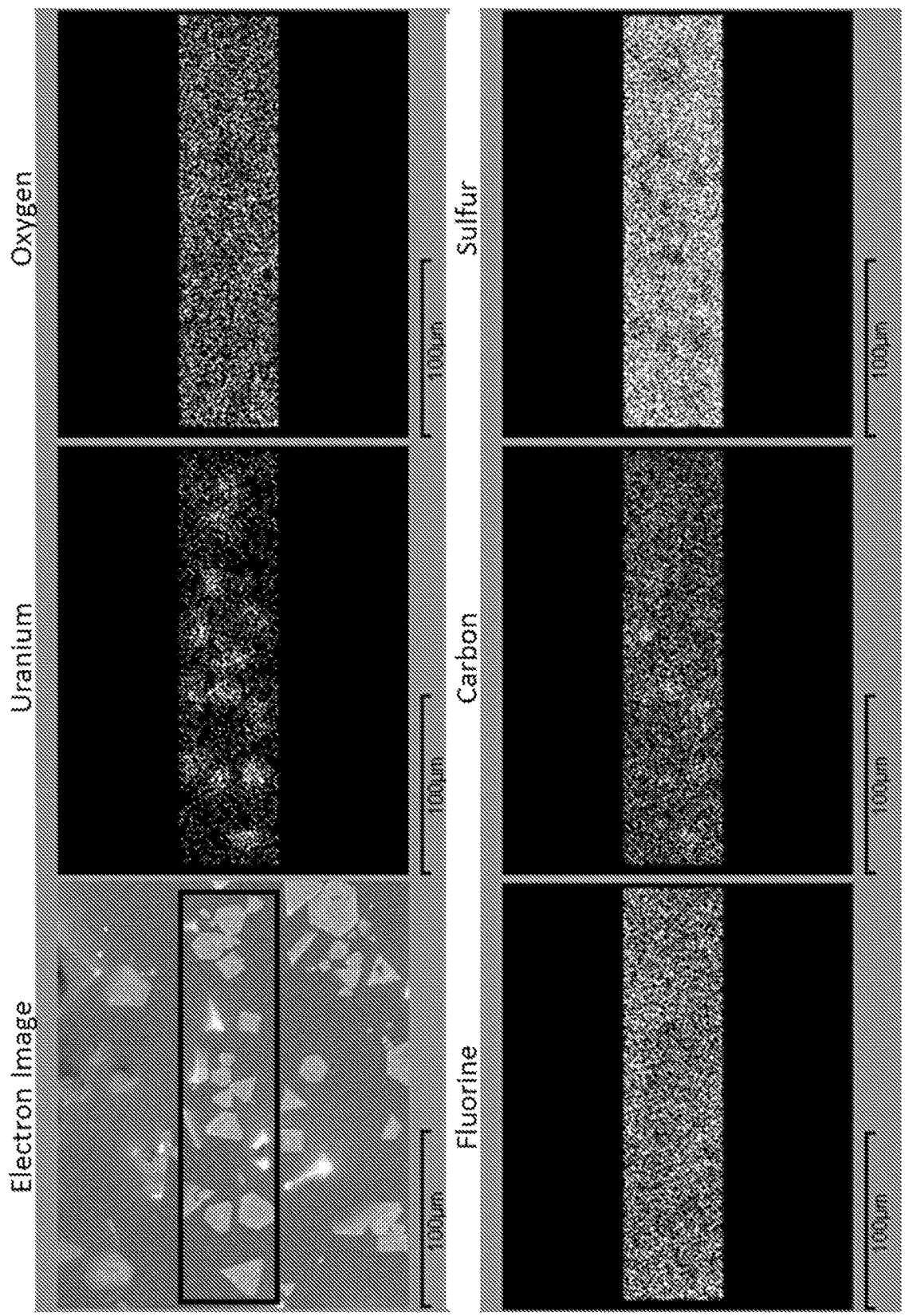
FIG. 3 is Energy Dispersive X-Ray Spectroscopy (EDS) maps for uranium, oxygen, fluorine, carbon and sulfur.
Figure 4:
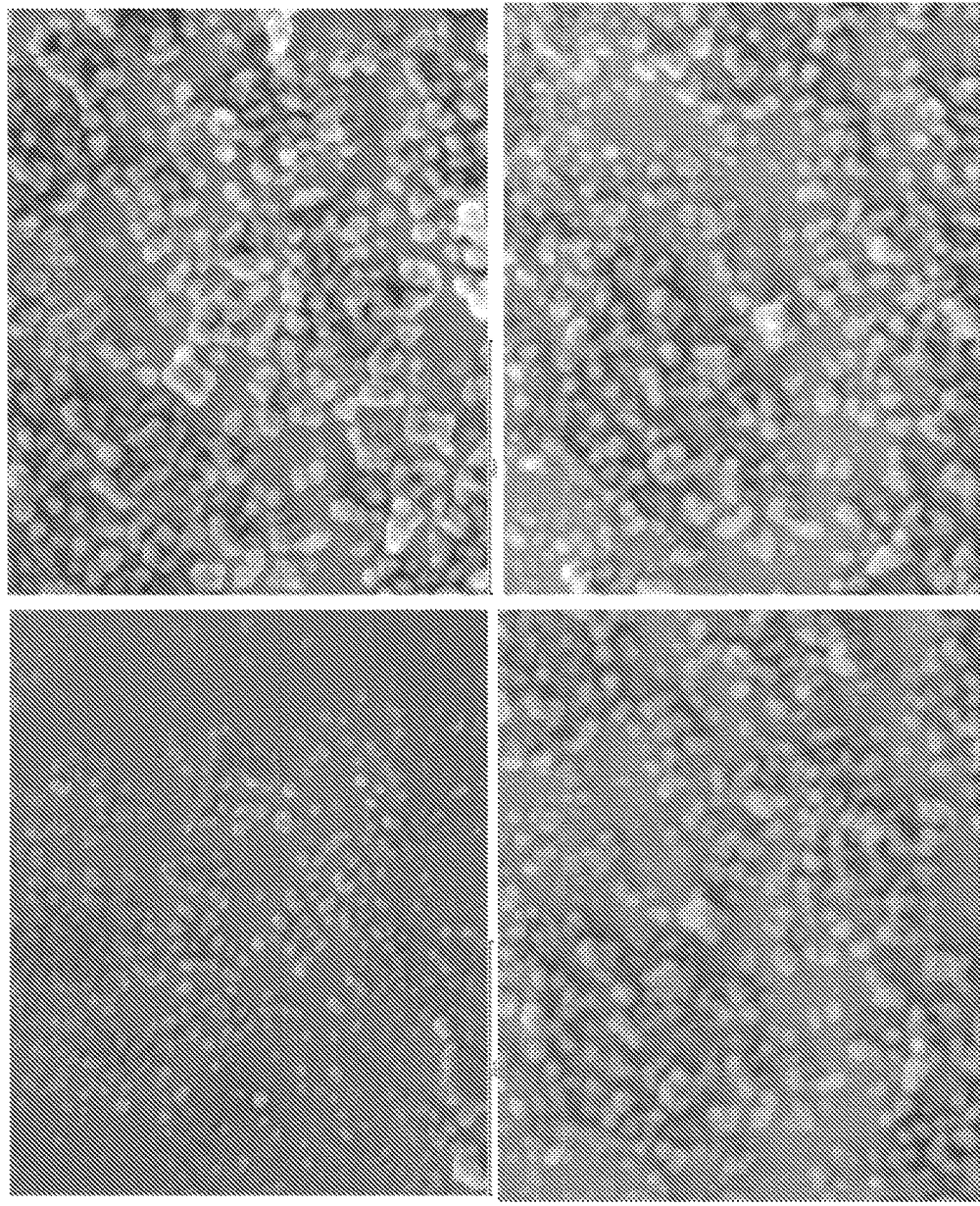
FIG. 4 is SEM images of the uranium deposits following electrochemical deposition from $UF_6$ in IL.
Figure 5:
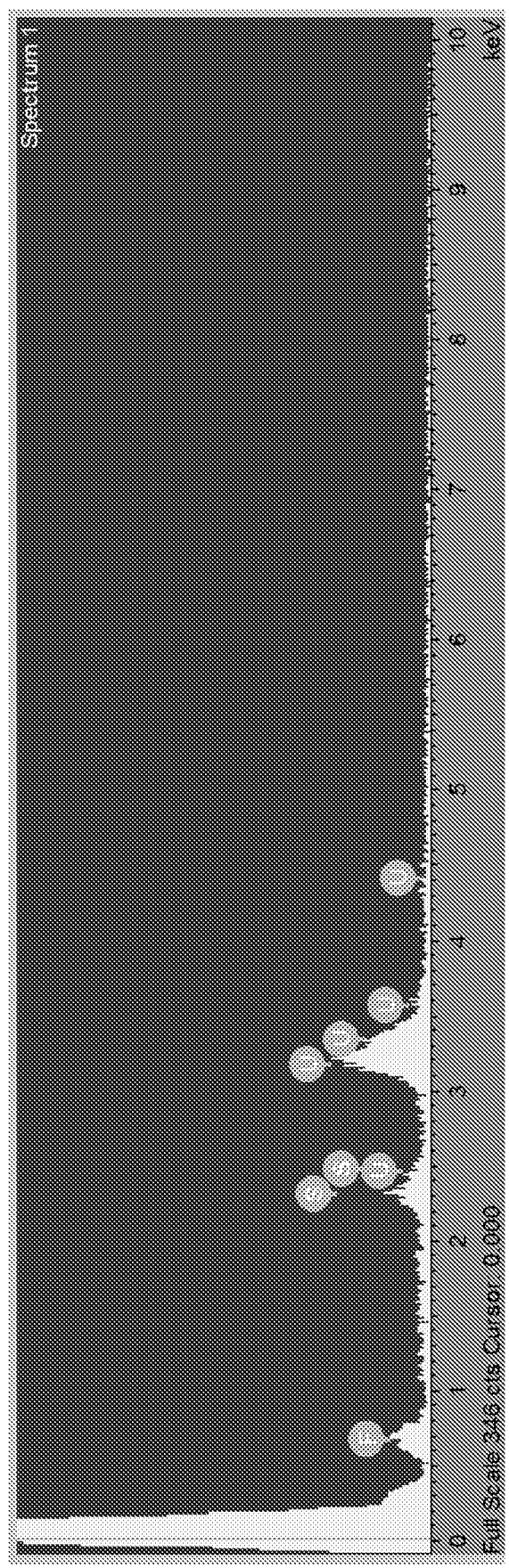
FIG. 5 shows elemental analysis of the uranium deposits of FIG. 4.

The deposits were further analyzed by Energy Dispersive X-Ray Spectroscopy (EDS) as shown in FIGS. 2A and 2B, which at higher resolution (500× magnification) showed uranium metal geometric crystals. Speciation analysis on the geometric crystals is shown in FIG. 3. The geometric crystals were found to consist almost entirely of uranium metal. The baseline oxygen levels were consistent throughout, even in areas where there was no deposition of uranium crystals. Elemental analysis of the deposits was completed, as shown in FIG. 5. Some residual fluorine was detected.

Example 3: Precipitation from UF$_6$/IL

The dissolution process as described in Example 1, was used to dissolve greater than 0.5M UF$_6$ in MPPiTFSI. Upon dissolution, a green precipitate was observed. The precipitate was recovered using filtration followed by an acetone wash to minimize residual ionic liquid. The precipitation method utilizes an ionic liquid that comprises an anion with a lone pair of electrons, such that the reduced uranium hexafluoro anion forms a salt with the cation of the ionic liquid.

Figure 6:
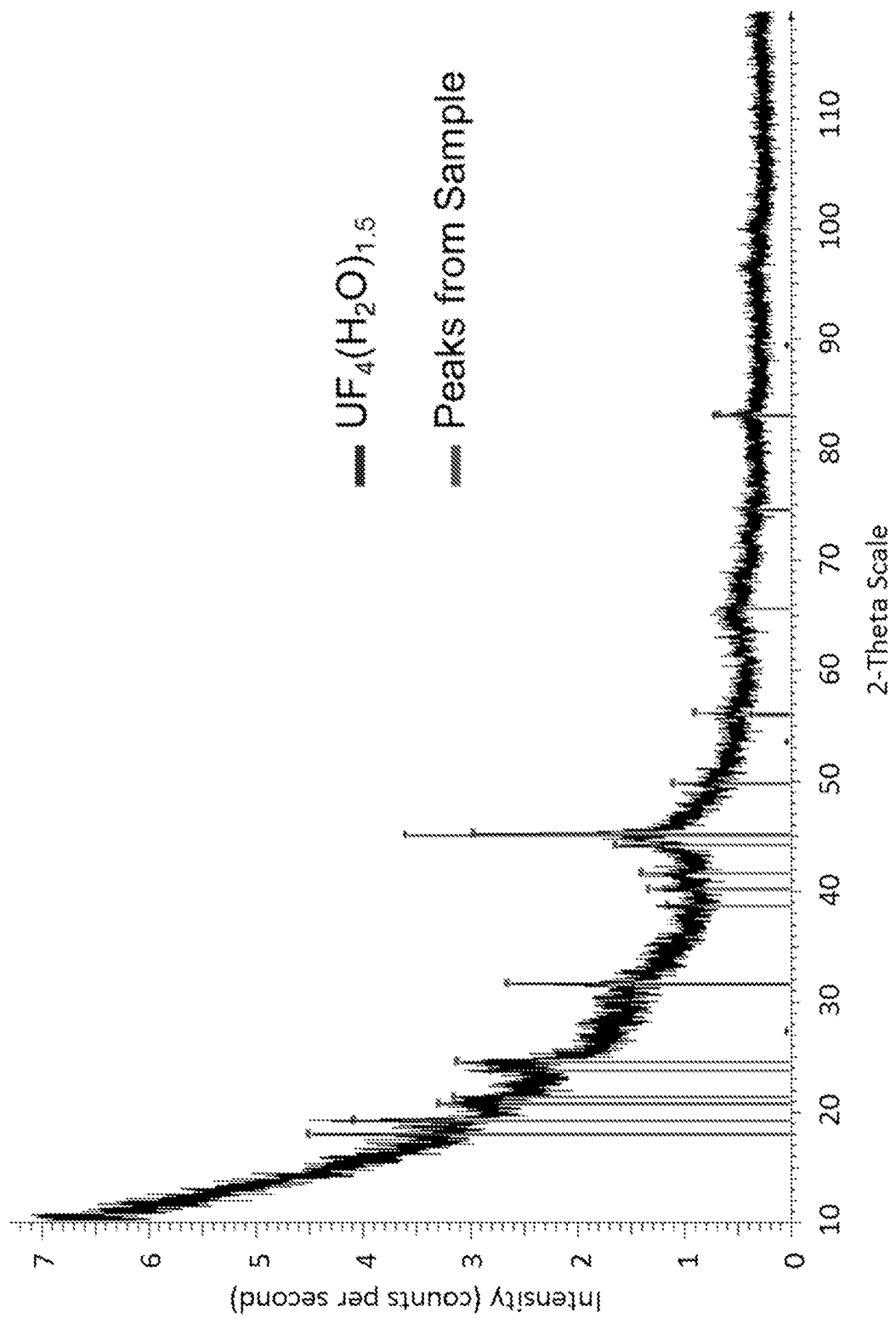
FIG. 6 is a powder X-ray diffraction (PXRD) pattern of the uranium precipitate.

The precipitate was analyzed by powder X-ray diffraction (PXRD) (FIG. 6). Peaks from the sample partially matched with those for a known sample of UF$_4$(H$_2$O)$_{1.5}$, suggestive that the precipitate included uranium in the +4 oxidation state and not the +6 oxidation state.

Thermogravimetry analysis (TGA) (FIG. 7) was utilized to determine the metal content and the speciation based on correlation of mass loss and possible chemical species (Table 1). Calculations were completed by calculating the moles U in the sample following TGA/DSC and comparing that to the calculated mass of the initial sample if those chemical species listed in Table 1 were that of the initial sample. Multiple repeats of the process and the analysis have shown consistent results for the formation of a uranium hexafluoro anion salt with the cation of the ionic liquid.

TABLE 1

Gravimetric Analysis. Average mass loss of samples was 59.8 ± 1.2%.

| Compound | Average Error | Std. Dev |
|---|---|---|
| UF$_3$(TFSI)$_3$*3(MPPi) | 131.5% | 6.8% |
| UF$_4$(TFSI)$_2$*2(MPPi) | 71.7% | 5.0% |
| UF$_5$(TFSI)*MPPi | 11.9% | 3.3% |
| UF$_6$*2(MPPi) | −5.7% | 2.8% |
| UF$_4$(TFSI)*(MPPi) | 9.1% | 3.2% |
| UF$_4$(TFSI)$_2$ | 29.5% | 3.8% |
| UF$_2$(TFSI)$_2$ | 23.9% | 3.6% |

Figure 7:
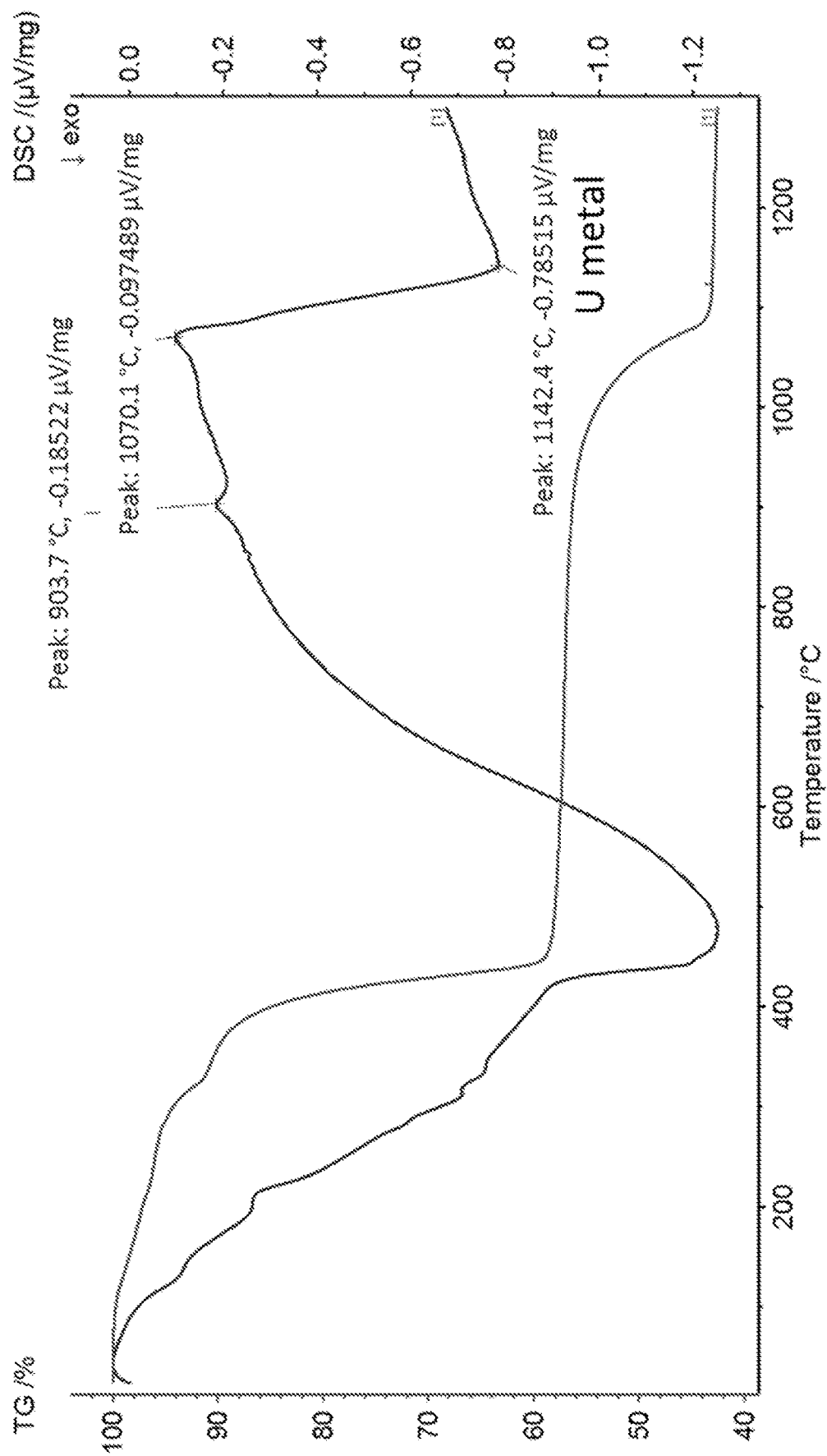
FIG. 7 is a graph of the simultaneous thermogravimetry & differential scanning calorimetry (TGA(green)/DSC (blue)) analysis of the uranium precipitate.

As shown in FIG. 7, TGA analysis was consistent with the melting of uranium metal from 1070.1° C. to 1142.4° C. This suggests that well-known methods for thermal treatment may be used to recover uranium metal. In addition, PXRD analysis following TGA showed that heating in oxygen containing environments results in formation of UO$_2$ (FIG. 8). UO1 indicated that the uranium and oxygen atoms are slightly less than a 1:2 ratio. The sulfur in UOS was likely from residual TFSI. In either UO$_2$ or UOS, uranium is in the +4 oxidation state. Total mass of uranium confirmed the ratio of organic cation and inorganic U for the calculation.

Conversely, when these experiments were completed under Argon, UO$_2$ formation was not detected.

For reasons of completeness, various aspects of the invention are set out in the following numbered clauses:

Clause 1. A method for recovering uranium, comprising dissolving uranium hexafluoride (UF$_6$) directly into an ionic liquid at concentrations greater than 0 M and less than or equal to 0.5 M; and applying a potential to the ionic liquid to deposit uranium onto an electrode as a metal.

Clause 2. The method of clause 1, further comprising chilling the UF$_6$ prior to dissolving the UF$_6$ in the ionic liquid.

Clause 3. The method of clause 1 or clause 2, wherein the ionic liquid comprises an anion with a lone pair of electrons.

Clause 4. The method of any of clauses 1-3, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate.

Clause 5. The method of any of clauses 1-4, wherein the ionic liquid comprises n-bis(trifluoromethanesulfonylimide) (TFSI) anion.

Clause 6. The method of any of clauses 1-5, wherein the ionic liquid comprises a cation that does not undergo reductive decomposition at a potential between −2 and −4 Volts.

Clause 7. The method of any of clauses 1-6, wherein the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations.

Clause 8. The method of any of clauses 1-7, wherein the ionic liquid comprises a cation selected from the group consisting of tetraalkylammonium cation, a dialkylpiperidinium cation, and dialkylpyrrolidinium cation.

Clause 9. The method of any of clauses 1-8, wherein the ionic liquid comprises methylpropyl piperidinium cation.

Clause 10. The method of any of clauses 1-9, wherein the applied potential is more negative than −2 Volts.

Clause 11. The method of any of clauses 1-10, wherein the applied potential is pulsed.

Clause 12. The method of any of clauses 1-10, wherein the applied potential is constant.

Clause 13. A method for recovering uranium, comprising dissolving uranium hexafluoride ($UF_6$) directly into an ionic liquid at concentrations greater than or equal to 0.5 M to form a solid precipitate in an ionic liquid solution; separating the solid precipitate from the ionic liquid solution; and thermal processing.

Clause 14. The method of clause 13, wherein the thermal processing is in an inert atmosphere to form uranium metal.

Clause 15. The method of clause 13, wherein the thermal processing is in an ambient atmosphere to form uranium oxide, $UO_2$.

Clause 16. The method of any of clauses 13-15, further comprising chilling the $UF_6$ prior to dissolving in the ionic liquid.

Clause 17. The method of any of clauses 13-16, wherein the ionic liquid comprises an anion with a lone pair of electrons.

Clause 18. The method of any of clauses 13-17, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and frifluoromethylacetate.

Clause 19. The method of any of clauses 13-18, wherein the ionic liquid comprises bis(trifluoromethanesulfonylimide) (TFSI) anion.

Clause 20. The method of any of clauses 13-19, wherein the ionic liquid comprises a cation that does not undergo reductive decomposition at a potential between −2 and −4 Volts.

Clause 21. The method of any of clauses 13-20, wherein the ionic liquid comprises a cation selected from the group consisting of alkyl-substituted or unsubstituted ammonium cations or alkyl-substituted or unsubstituted piperidinium cations.

Clause 22. The method of any of clauses 13-21, wherein the ionic liquid comprises methylpropyl piperidinium cation.

Clause 23. The method of any of clauses 13-22, wherein the solid precipitate comprises a salt of a uranium hexafluoro anion and an ionic liquid cation.

Clause 24. The method of any of clauses 13-23, wherein the ionic liquid solution comprises uranium hexafluoride dissolved in the ionic liquid.

Clause 25. The method of any of clauses 13-24, further comprising applying a potential to the ionic liquid solution after separation of the solid precipitate to deposit uranium onto an electrode as a metal.

Clause 26. The method of clause 25, wherein the applied potential is more negative than −2 Volts.

Clause 27. The method of clause 25 or clause 26, wherein the applied potential is pulsed.

Clause 28. The method of clause 25 or clause 26, wherein the applied potential is constant.

What is claimed is:

1. A method for recovering uranium, comprising dissolving uranium hexafluoride ($UF_6$) directly into an ionic liquid at concentrations greater than or equal to 0.5 M to form a solid precipitate in an ionic liquid solution; separating the solid precipitate from the ionic liquid solution; and thermal processing the solid precipitate.

2. The method of claim 1, wherein the thermal processing is in an inert atmosphere to form uranium metal.

3. The method of claim 1, wherein the thermal processing is in an ambient atmosphere to form uranium oxide, $UO_2$.

4. The method of claim 1, further comprising chilling the $UF_6$ prior to dissolving in the ionic liquid.

5. The method of claim 1, wherein the ionic liquid comprises an anion with a lone pair of electrons.

6. The method of claim 1, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and frifluoromethylacetate.

7. The method of claim 1, wherein the ionic liquid comprises bis(trifluoromethanesulfonylimide) (TFSI) anion.

8. The method of claim 1, wherein the ionic liquid comprises a cation that does not undergo reductive decomposition at a potential between −2 and −4 Volts.

9. The method of claim 1, wherein the ionic liquid comprises a cation selected from the group consisting of alkyl-substituted or unsubstituted ammonium cations or alkyl-substituted or unsubstituted piperidinium cations.

10. The method of claim 1, wherein the ionic liquid comprises methylpropyl piperidinium cation.

11. The method of claim 1, wherein the solid precipitate comprises a salt of a uranium hexafluoro anion and an ionic liquid cation.

12. The method of claim 1, wherein the ionic liquid solution comprises uranium hexafluoride dissolved in the ionic liquid.

13. The method of claim 12, further comprising applying a potential to the ionic liquid solution after separation of the solid precipitate to deposit uranium onto an electrode as a metal.

14. The method of claim 13, wherein the applied potential is more negative than −2 Volts.

15. The method of claim 13, wherein the applied potential is pulsed.

16. The method of claim 13, wherein the applied potential is constant.

* * * * *